UNITED STATES PATENT OFFICE.

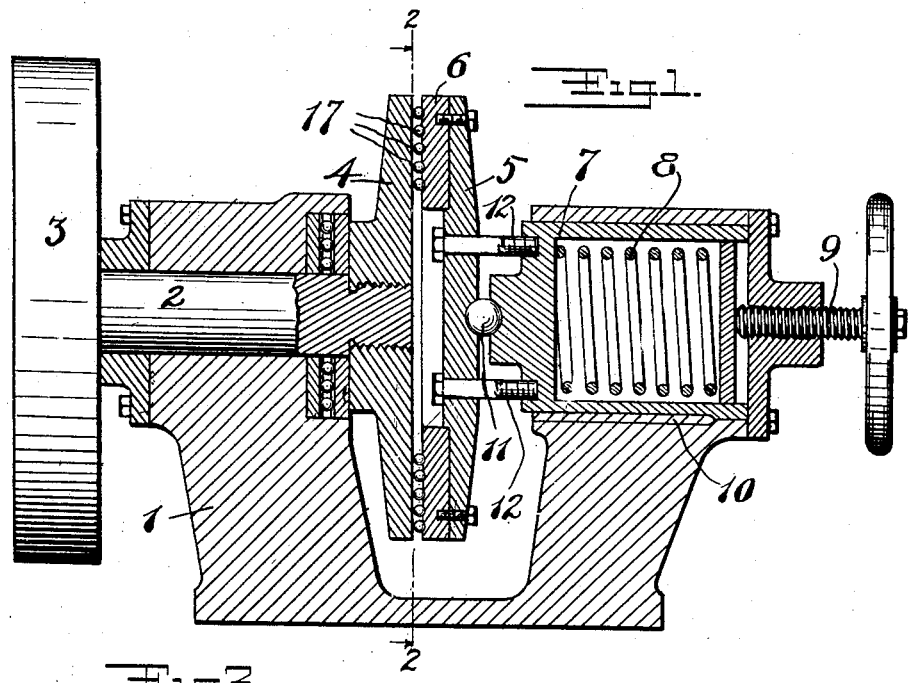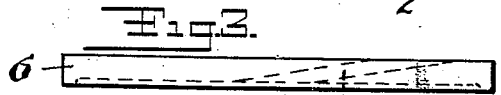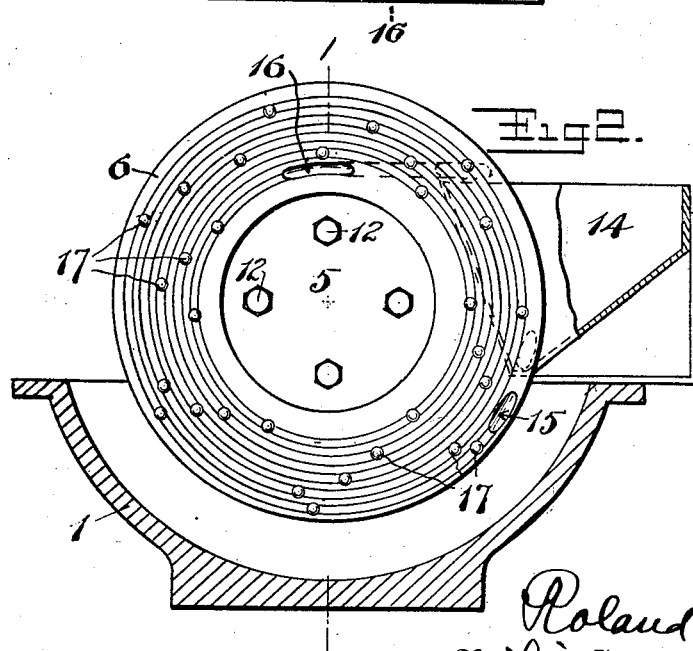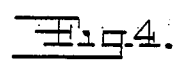

ROLAND WINCHESTER SELLEW, OF MIDDLETOWN, CONNECTICUT, ASSIGNOR TO THE FAFNIR BEARING COMPANY, OF NEW BRITAIN, CONNECTICUT, A CORPORATION OF CONNECTICUT.

BALL-LAPPING MACHINE.

1,343,011.      Specification of Letters Patent.      Patented June 8, 1920.

Application filed September 16, 1919. Serial No. 324,054.

*To all whom it may concern:*

Be it known that I, ROLAND W. SELLEW, a citizen of the United States of America, residing at Middletown, Conn., have invented a new and useful Ball-Lapping Machine, of which the following is a specification.

This invention relates to a machine for lapping metallic balls to a finished size and shape, the object being to provide means for improving the operation of such machine whereby a fine degree of accuracy is insured both as to size and roundness.

In the accompanying drawing:—

Figure 1, is a longitudinal section on the plane of the line 1—1 of Fig. 2.

Fig. 2, is a cross section on the plane of the line 2—2 of Fig. 1.

Fig. 3, is an edge elevation of a detail, namely, a grinding plate, showing the outlet in dotted outline.

Fig. 4, is an edge elevation of the same detail viewed from another position, and showing the inlet in dotted outline.

The main parts of the machine comprise a base or frame 1 having journaled therein a shaft 2 carrying a pulley 3. The shaft 2 carries at its inner end a plate 4, the outer face of which is preferably flat or substantially so. 5 is a second plate facing the plate 4 and arranged to carry on its face a grooved plate 6, the same being secured thereto in any desired manner. The plate 5 is mounted on the end of a carrier 7 so as to have a universal movement. The carrier 7 is mounted to slide longitudinally in the frame 1 and is pressed forwardly by means of a spring 8 the tension of which may be adjusted in any suitable manner as by a screw 9. In the form shown, the carrier is cylindrical and is held against turning by a key or spine 10. The universal action between the carrier 7 and the plate 5 in its preferred form comprises a central bearing support in the form of a ball 11, while around the ball 11 are placed a plurality of stud bolts 12, 12 which pass freely through the plate 5 and screw into the end of the carrier 7, thereby holding the plate against rotary movement, at the same time permitting it to tilt in any direction. 14 is a hopper which lies up close to the plates 5 and 6, as indicated in Fig. 2. This hopper has a discharge chute at its lower end which communicates with an oblique feed passage 15 extending through the plates 5 and 6 and leading into the outer end of the groove in the plate 6. This groove in the plate 6 is of the helical type and the inner end of the same communicates with an oblique outlet passage 16 which leads back into the hopper 14. 17, 17 represent balls located in the aforesaid groove and between the plates 6 and 4. These plates press against the ball with a degree of pressure depending upon the adjustment of the spring 8. The working pressure on all the oversized balls will be substantially equal due to the fact that said pressure is derived from a single central source through the universal bearing 12. By reason of this balanced pressure on the oversized balls the same will be dressed down evenly and uniformly so as to produce uniformity in size and roundness. The plate 4 is revolved by the pulley in such a direction as to cause the balls to travel through the groove from the outer to the inner end, thus the balls contained in the hopper 14 will be successively passed between the plates 4 and 6, thence back into the hopper 14 and if necessary again between the plates. This action is continued until all the balls respond to the desired tests to determine the size and roundness. It will be understood of course that the lapping action is aided by the proper use of oil and the finely powdered abrasive, as is customary in this art.

It will be understood that I have shown my invention in only one preferred form and that various changes may be made without departing from the spirit and scope of the appended claims. I have particularly in mind the thought that either plate 4 or 6 might be the universally mounted plate and that either passage 15 or 16 might be the inlet passage.

I claim:—

1. In a ball lapping machine, a frame, two plates facing each other, one of said plates having a helical groove in its face arranged to receive balls to be operated upon, means for yieldingly pressing said plates toward each other and for applying said pressure at substantially the center of said plate to secure balanced action, one of said plates being rotatable relatively to the other and one of said plates being mounted for universal movement relatively to the other.

2. In a ball lapping machine, a substantially flat faced rotatable plate, a relatively non-rotatable plate facing the first mentioned plate and mounted at its center to tilt in any direction, a substantially flat faced ring carried by the last mentioned plate and having a helical groove in its flat face for receiving balls to be operated upon, and means for yieldingly pressing said plates toward each other to apply the desired pressure to said balls, said pressure being applied through said center mounting to thereby apply a substantially equal working pressure on all of the over-sized balls being acted upon.

3. In a ball lapping machine, two oppositely faced plates, one of the same being rotatable, a central universal mounting for one of said plates whereby the same can tilt in any direction, means for applying pressure to said plate through said mounting, a spiral groove in the operative face of one of said plates for receiving balls to be operated upon, a hopper for feeding balls successively into one end of the spiral groove and a discharge passage for the other end of said groove.

ROLAND WINCHESTER SELLEW.